United States Patent [19]

Cumming

[11] 4,358,000
[45] Nov. 9, 1982

[54] MULTIPLE PISTON FRICTION BRAKE

[75] Inventor: James C. Cumming, Pleasant Ridge, Mich.

[73] Assignee: Rockwell International Corporation, Pittsburgh, Pa.

[21] Appl. No.: 205,534

[22] Filed: Nov. 10, 1980

[51] Int. Cl.³ .............................................. F16D 55/40
[52] U.S. Cl. .................................. 188/71.5; 188/72.4; 188/170
[58] Field of Search .................. 188/170, 106 F, 71.5, 188/72.3, 72.4, 264 E, 366; 192/91 R

[56] References Cited

U.S. PATENT DOCUMENTS 3,770,085 11/1973 Cottingham ........................ 188/170
3,895,695 7/1975 Hunter .............................. 188/170
3,946,837 3/1976 Houser .............................. 188/72.4

Primary Examiner—Douglas C. Butler
Assistant Examiner—R. R. Diefendorf

[57] ABSTRACT

An improved brake for a wheel mounted on a spindle is of the type which includes a housing secured to the spindle with a plurality of brake discs carried by the housing for relative rotation therewith. A plurality of reaction plates are carried by the hub of the wheel for relative rotation therewith and the discs and plates are intervened in an alternating fashion to define a pack. A first piston is axially, slidably mounted in a bore with the housing to define a first expandable chamber therebetween. Hydraulic fluid is selectively introduced to and discharged from the first chamber to produce selective movement of the first piston axially relative to the bore to cause it to produce a compressive force on the pack. The improvement includes adding a parking brake feature by providing a different backing plate portion to the housing. An annular cavity in the improved backing plate slidably receives a second piston therein. The second piston is biased to cause an axial extension thereof to contact the first piston to produce a compressive force on the pack. The introduction of hydraulic fluid to a second chamber between the second piston and the cavity will axially move the second piston away from the pack, overcoming the biasing and preventing it from applying the compressive force to the pack.

1 Claim, 2 Drawing Figures

MULTIPLE PISTON FRICTION BRAKE

BACKGROUND OF THE INVENTION

1. Field of the Invention

This invention relates to an improved multi-disc friction brake which includes a basic actuation piston and bore configuration which is simple and less expensive to provide and, more specifically, to such a brake which is improved to include a parking brake feature while utilizing many of the identical parts of a basic brake without the parking brake feature.

2. Description of the Prior Art

There have heretofore been utilized a number of friction brakes which employ a plurality of relatively rotating friction discs and a means for applying compressive forces therebetween to produce the braking action. Some such friction brakes as those disclosed in U.S. Pat. Nos. 3,927,737; 3,941,219; and 4,146,116, utilize a circular actuation piston which has a cross-section at one side thereof which is generally L-shaped. Other brake configurations, such as those disclosed in U.S. Pat. Nos. 3,132,724 and 3,198,295, use a circular piston which is generally annular. Still other friction brakes, such as those disclosed in U.S. Pat. Nos. 3,081,842; 3,301,359; and 4,173,269, employ actuation pistons which have at one side thereof a generally T-shaped cross-section.

While the actuation piston devices in each of these friction brakes include a number of features which are quite different, there has remained a common problem of manufacturing tolerances and general engineering manufacturing instructions in the formation of each which contributes significantly to the overall expense and complexity of manufacturing these brakes. In general, their manufacture included a common concern for the tolerances of various diameters, the tolerances regarding concentricity of various surfaces, the smoothness of various surfaces during final machining and the tolerances and dimensions of piston or seal ring grooves formed in the surfaces.

A basic brake for use in the heavy duty vehicle field, as disclosed in a co-pending application by the same inventor, U.S. Ser. No. 193,511 filed on Oct. 2, 1980, and entitled "Friction Brake," has been designed to eliminate some of these problems and concerns. However, different vehicles have different brake requirements. In some installations the basic brake can be satisfactorily employed while the brake for other installations must include a parking brake feature. It has not been uncommon in the past to provide two completely different brakes for these installations. If the brakes utilize completely different parts, tooling and inventory requirements are increased and assembly and maintenance procedures are more complicated.

SUMMARY OF THE INVENTION

It is, therefore, an object of this invention to provide a multi-disc friction brake which includes a basic actuation piston and bore configuration which is improved to include a parking brake feature while utilizing many of the identical parts of the basic brake without the parking brake feature.

These and other objects of the invention are provided in a preferred embodiment thereof which includes an improved brake for relatively rotating first and second members of the type which includes a housing having a cylindrical portion and a backing plate. The cylindrical portion is secured to the braking plate which is, in turn, secured to the first member. A plurality of brake discs carried by the housing and a plurality of reaction plates carried by the second member are intervened in alternating fashion to define a pack. The housing has a central bore with a first piston being axially, slidably mounted therein to define a first expandable chamber therebetween. First and second generally U-shaped expandable seals are mounted in the ends of the first chamber to produce sliding, sealing contact with the interior cylindrical surface of the cylindrical portion of the housing and the exterior cylindrical surface of the first piston defining the first chamber. There is means for selectively introducing hydraulic fluid to and discharging hydraulic fluid from the first chamber between the first and second seals as the hydraulic fluid is sealingly retained therein by the first and second seals. The hydraulic fluid is capable of acting on the first piston for selective movement thereof axially relative to the bore. A tubular portion of the first piston has an end remote from the bore which includes a radially inwardly extending shoulder which is aligned with the pack to provide compressive braking force thereto when the first piston is moved axially toward the pack by the introduction of the hydraulic fluid to the first chamber. The improvement includes the backing plate having an annular cavity therein open toward an interior of the housing. The cavity is defined by an inwardly facing cylindrical surface and an inwardly extending flange at an end thereof toward the interior of the housing. A second piston is axially, slidably mounted within the cavity and has an outwardly facing cylindrical surface and an outwardly extending flange thereof at an end thereof remote from the interior of the housing. The inwardly extending flange, the inwardly facing cylindrical surface, the outwardly facing cylindrical surface and the outwardly extending flange define a second expandable chamber between the cavity and the second piston. Axially extending means on the second piston extend into the interior of the housing in alignment with the radially inwardly extending shoulder of the first piston. There is means for biasing the second piston toward the pack to cause the axially extending means to contact the radially inwardly extending shoulder which is capable of providing a compressive braking force to the pack. A third generally U-shaped expandable seal in the second chamber is seated against the inwardly extending flange of the backing plate. A fourth generally U-shaped expandable seal in the second chamber is seated against the outwardly extending flange of the second piston. The third and fourth seals each have a pair of lips capable of respectively making sliding, sealing contact with the inwardly facing cylindrical surface and the outwardly facing cylindrical surface. There is means for the selective introduction of hydraulic to and discharge of hydraulic fluid from the second chamber between the third and fourth seals. Introduction of the hydraulic fluid is capable of axially moving the second piston away from the pack in opposition to the mean for biasing and the discharge of hydraulic fluid allows the means for biasing to produce the compressive braking force to the pack.

DETAILED DESCRIPTION OF THE PREFERRED EMBODIMENT

Figure 1:
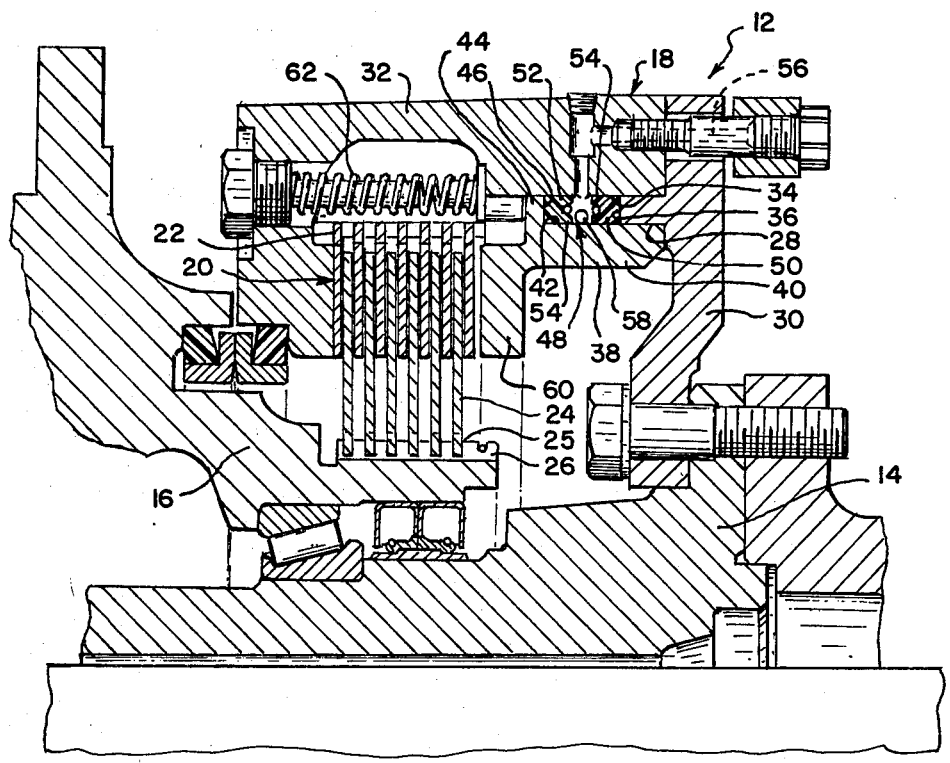
FIG. 1 is a sectional side view of a basic brake without any associated parking brake feature.

As seen in FIG. 1, a basic brake 12, which is the subject of the copending application mentioned hereinabove, includes some features regarding manufacturing tolerances and instructions not previously found in prior art brakes. Specifically, the basic brake 12 is intended to selectively prevent or reduce relative rotation between a first element and a second element. In the brake 12 the first element is an axle spindle 14 and the second element is the hub 16 of a wheel mounted for rotation relative to the spindle 14. A housing 18 is rigidly secured to the spindle 14 and sealingly encloses a braking pack 20 of friction elements in the form of braking discs 22 and reaction plates 24. The braking discs 22 are mounted in the housing 18 for no relative rotation therebetween while allowing limited axial movement relative to the housing 18. The reaction discs 24 are mounted for relative rotation with the hub 16 by their being received at a hole 25 therethrough on a splined portion 26 of the hub 16. The mounting of the reaction plates 24 in this manner will allow some axial movement of the reaction plate 24 relative to the hub 16.

The housing 18 includes a bore 28 which is formed by the structural combination of a backing plate 30 and a generally cylindrical outer portion 32 of the housing 18 to provide the generally L-shaped structure needed for the bore 28. Specifically, the bore 28 is defined by an interior cylindrical surface 34 on the portion 32 and a radially, inwardly extending annular wall 36 which is an integral portion of the backing plate 30. A piston 38 includes a tubular portion 40 having a cylindrical outer surface 42 and a radially, outwardly extending wall 44 having an annular surface 46 which extends outwardly from the cylindrical outer surface 42.

The piston 38 is axially, slidably mounted in the bore 28 with the annular wall 36, the interior cylindrical surface 34, the exterior cylindrical surface 42 and the annular surface 46 defining an expandable chamber 48 between the bore 28 and the piston 38. To seal the chamber 48 a pair of seals 50, 52 are provided at both ends of the chamber. The seal 50 is of the generally U-shaped expandable type and is seated against the annular wall 36 of the bore 28 and includes a pair of lips 54 which are capable of respectively making sliding, sealing contact with the interior cylindrical surface 34 and the exterior cylindrical surface 42. The seal 52 is of similar construction and is seated against the annular surface 46 of the piston 38 with its pair of lips 54 also being capable of respectively making sliding, sealing contact with the interior cylindrical surface 34 and the exterior cylindrical surface 42.

The housing 18 includes a hydraulic passage 56 therethrough which terminates at an intermediate region of the chamber 48 for the introduction of hydraulic fluid to and the discharge of hydraulic fluid from the chamber 48. The hydraulic fluid is sealingly retained within the intermediate region of the chamber 48 between the seals 50, 52 and is capable of acting on the piston 38 for its selective movement axially relative to the bore 28. During installation of the piston 38 and the seals 50, 52 within the bore 28, a ring 58 is installed between the seals 50, 52 in the intermediate region of the chamber 48 for the purposes of insuring their separation and proper seating respectively against the wall 36 and the surface 46. During normal operation of the brake 12 the ring 58 serves no actual function and will not interfere with the operation of the piston 38. Once the seals 50, 52 are properly seated during the normal operation of the brake 12 they would not be expected to be dislodged and would properly operate to seal the hydraulic fluid introduced to the intermediate region of the chamber 48.

With selective movement of the piston 38, an inwardly extending annular portion 60 of the piston 38 will be brought into contact with the braking pack 20 of friction elements to selectively produce the desired braking action tending to prevent or reduce the relative rotation of the wheel about the spindle 14.

To insure proper repositioning of the piston 38 upon discharge of hydraulic fluid from the chamber 48, a plurality of springs 62 are mounted within the housing 16 in alignment with the piston 38 tending to move it axially relative to the bore 28 away from the pack 20. Obviously, the hydraulic fluid introduced to the chamber 48 for the selective application of the desired braking force is capable of overcoming the biasing effect of the springs 62 to provide sufficient compressive braking force to the pack.

Having thus explained the basic operation and features of the basic brake 12, it is appropriate to examine the engineering instructions which are required for its manufacture. The only critical engineering tolerances required are those related to the proper diameter of the interior cylindrical surface 34 of the bore 28 and the exterior cylindrical surface 42 of the piston 38. Additionally, during final finishing it is also important that acceptable surface smoothness be provided to the interior cylindrical surface 34 and the exterior cylindrical surface 42 for the proper operation of the seals 50, 52 thereon. Because of the design and operation of the seals 50, 52 no further critical engineering instructions or tolerances are required for the basic brake 12. Even the tolerances between the cylindrical outer edge of the radially inwardly extending wall 36 and the interior cylindrical surface 34 are not critical since normal manufacturing tolerances will allow their proper mating. Since the seal 50 will prevent any leakage thereby which might otherwise escape between the radial wall 36 and the interior cylindrical surface 34, even when the backing plate 30 is joined to the cylindrical portion 32 no sealing is needed between these elements. Similarly, the fitting of the piston 38 at the interior cylindrical edge of the wall 36 is not critical and a gap in this region would again present no problems because of the operation of the seal 50. Additionally, at the other end of the chamber 48, the seal 52 will prevent the escape of hydraulic fluid between the interior cylindrical surface 34 and the outer periphery of the radially, outwardly extending wall 44 of the piston 38 so that the mating of these elements can be produced with normal manufacturing tolerances.

The operation of the seals 50, 52 with their lips 54 being capable of sufficient outward expansion to produce the desired sealing allows the seals 50, 52 to be properly seated on the respective surfaces of the wall 36 and the annular surface 46 without their having to be final machined for any critical smooth surface requirements. It can therefore be seen that a summation of all of the critical engineering tolerance requirements and surface requirements for the basic brake 12 is limited to a total of four in the form of the two critical diameters for and the surface conditions of the internal cylindrical surface 34 and the external cylindrical surface 42.

Accordingly, the introduction of the seals 50, 52 to a bore-piston configuration in the manner described hereinabove has significantly reduced the required engineering instructions and tolerance requirements and therefore would be expected to significantly reduce the overall cost of manufacturing the brake. Although the basic brake 12 has utilized seals 50, 52 in a unique manner, the seals themselves are not that unique and any number of type of such seals might have been utilized in the manner described hereinabove. For example, there are such seals disclosed in U.S. Pat. Nos. 3,169,776; 3,653,672; 3,738,665; 3,851,888; and 4,013,299.

As thus explained, the basic brake 12 can be utilized in any number of heavy duty vehicle installations which do not require the additional feature of a parking brake. Basically, the brake 12 would be connected to the hydraulic system associated with the brake pedal in a vehicle so that axial movement of the piston 38 could be regulated and controlled for controlled braking of the vehicle. However, in those installations in which a parking brake feature is desired, it is normally expected that the parking brake can be applied to provide compressive force to the pack 20 without the need for the introduction or use of hydraulic fluid. Since the vehicle might not be in a running mode and many of its systems might be shut down when the parking feature is to be utilized, simply introducing hydraulic fluid to the basic brake 12 would not be a satisfactory or acceptable method of including a parking brake feature.

However, the addition of a parking brake feature to a brake would not automatically alter the method of applying the compressive force with the basic brake or the equipment used therein for that purpose. Nevertheless, a number of basic brakes in the past have either been so complicated or the additional features needed to provide a parking mode have been so complicated that a significant number of parts for the two brakes are different and the amount of interchangeability of parts is quite limited. Obviously, if the basic brake without a parking feature and the brake with a parking feature can utilize a increased number of parts which are applicable to both, the tooling and inventory requirements for providing both brakes would be significantly reduced. Additionally, the procedures for assembling the two brakes would be simplified as would the requirements for maintenance in the field.

As thus explained, the basic brake 12 could be employed to satisfactorily provide the braking force needed in association with the brake pedal on such vehicles. The inclusion in the basic brake 12 of the features mentioned hereinabove which reduce the overall engineering instructions and manufacturing tolerance requirements make the adaptation of the brake for the inclusion of the parking brake feature particularly attractive. Specifically, the fact that there are no critical tolerance requirements for the backing plate 30 means that the preferred brake 12' can utilize all of the brake elements mentioned hereinabove for the basic brake 12 with the exception of the backing plate 30.

Figure 2:
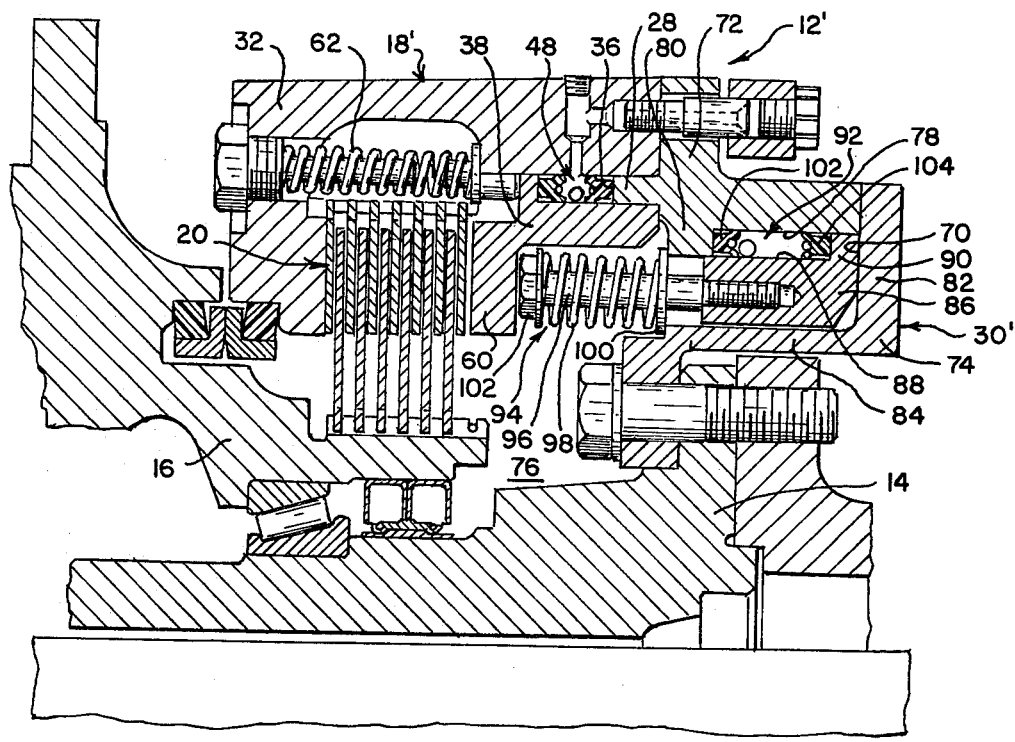
FIG. 2 is a sectional side view of the improved brake including various features of the invention.

As seen in FIG. 2, the preferred brake 12' utilizes a different backing plate 30' which has been designed to include another source for applying a compressive braking force to the pack 20 when the heavy duty vehicle is in an inactive, parked mode. The backing plate 30' is provided an annular cavity 70 which is formed by the joining by bolt means (not shown) of an outer portion 72 and an inner portion 74 of the backing plate 30'. The cylindrical portion 32 of the preferred housing 18' is joined to the outer portion 72 of the backing plate 30' in the same manner in which it was mounted to the backing plate 30 of the basic brake 12. Similarly, the inner portion 74 of the backing plate 30' is joined to the spindle 14 in the same manner as was the backing plate 30 of the basic brake 12. The outer portion 72 includes a radially inwardly extending wall 36 which is identical to the radially inwardly extending wall 36 of the backing plate 30 so that the assembly, function and operation of the bore 28 and the piston 38 are identical to that as described hereinabove for the basic brake 12.

The annular cavity 70 in the backing plate 30' is open toward the interior 76 of the housing 18'. The cavity 70 is defined in part by the outer portion 72 which includes an inwardly facing cylindrical surface 78 and an inwardly extending flange 80 at an end thereof toward the interior 76 of the housing 18'. The inward portion 74 of the backing plate 30' completes the definition of the cavity 70 by the provision of a rear wall 82 and a cylindrical wall 84.

A second annular piston 86 has a generally L-shaped cross section at one side thereof and is axially, slidably mounted within the cavity 70 to significantly include an outwardly facing cylindrical surface 88 and an outwardly extending flange 90 thereof which is remote from the interior 76 of the housing 18'. The inwardly extending flange 80, the inwardly facing cylindrical surface 78, the outwardly facing cylindrical surface 88 and the outwardly extending flange 90 define a second expandable chamber 92 between a portion of the cavity 70 and the piston 86.

To provide the compressive braking force to the pack 20 in a parking mode, it is desirable to utilize a means which will be activated when the heavy duty vehicle is in an inoperative mode. Accordingly, it is not uncommon that the compressive braking force in the parking mode be provided by some spring or other biasing means which is independent of hydraulic fluid pressure which is normally utilized to operate the brake in response to movement of the brake pedal in a vehicle. Accordingly, an axially extending means 94 on the second piston 86 extends into the interior 76 of the housing 18' in alignment with the radially inwardly extending shoulder 60 of the first piston 38. The axially extending means 94 of the preferred embodiment includes a plurality of bolts 96 which are threadedly secured to the second piston 86. Each bolt 96 has mounted thereon a spring 98 which is in a compressed condition between an interior wall 100 of the backing plate 30' and the head 102 of its associated bolt 94. Accordingly, the spring 98 provides a means for biasing the second piston 86 toward the pack 20 to cause the axially extending means 94 to contact the radially inwardly extending shoulder 60 of the first piston 38 to be thereby capable of providing a compressive braking force to the pack 20. The biasing by the plurality of springs 98 in this manner would operate independently of the operation of the first piston 38 as described hereinabove for the prior art brake 12. As a result, if there is no resistance to the movement of the second piston 86, the plurality of springs 98 will act on the plurality of bolts 96 to move the first piston 38 axially toward the pack 20 to provide a compressive braking force thereto which will prevent movement of the hub 16 relative to the spindle 14 when the parking mode is desired.

However, during normal operation of the vehicle, the parking brake function can be released by the axial movement of the piston 86 to the right as seen in FIG. 2 by the use of hydraulic fluid to control the position of the piston 86 within the cavity 70. For this purpose, a third generally U-shaped expandable seal 102 in the second chamber 92 is seated against the inwardly extending flange 80 of the backing plate 30' and a fourth generally U-shaped expandable seal 104 in the second chamber 92 is seated against the outwardly extending flange 90 of the second piston 86. The seals 102, 104 each have a pair of lips of capable of respectively making sliding, sealing contact with the inwardly facing cylindrical surface 78 and the outwardly facing cylindrical surface 88 in the manner described hereinabove for the seals 50, 52 in the first chamber 48.

Selective control of the axial position of the second piston 86 relative to the cavity 70 is accomplished by the introduction of hydraulic fluid to and discharge of hydraulic fluid from the second chamber 92 between the seals 102, 104 through a passage in the backing plate 30' (not shown) which is similar to the passage 56 of the basic brake 12. The hydraulic fluid introduced in this manner to the chamber 92 is capable of axially moving the second piston 86 away from the pack 20 in opposition to the biasing force created by the plurality of springs 98. As a result, the plurality of bolts 96 are no longer acting on the radially inwardly extending shoulder 60 of the first piston 38 preventing the compressive braking force from acting on the pack 20 when the parking mode is no longer desired. If the parking brake feature is to again be utilized, the hydraulic fluid is simply discharged from the interior of the cavity 92 so that the springs 98 may again produce sufficient biasing to the pack 20 to prevent relative rotation between the hub 16 and the sprindle 14. During normal operation of the heavy duty vehicle, the hydraulic fluid will be introduced to the cavity 92 so that the compressive braking force created by the introduction of hydraulic fluid to and the discharge of hydraulic fluid from the first chamber 48 will control the axial position of the first piston 38 to selectively produce compressive braking force to the pack 20 for the selective prevention or reduction of relative rotation of the hub 16 and the spindle 14.

As thus described, the improved brake 12' includes a configuration which utilizes all of the parts found in the basic brake 12 with the exception of the backing plate 30. Additionally, the inclusion in both the basic brake 12 and the preferred brake 12' of the features described hereinabove reducing the manufacturing tolerances and engineering instructions make the adaptation as provided by the preferred brake 12' particularly attractive. As a result, the backing plate 30' can include an outer portion 72 which can be easily joined to the cylindrical portion 32 without any concern regarding leakage of hydraulic fluid between the region of the joining. Additionally, the outer portion 72 and the inner portion 74 of the backing plate 30' can be joined without any need for critical manufacturing tolerances since the seals 102, 104 will retain hydraulic fluid in the second chamber 92 to eliminate the need for any critical joining or sealing of the outer portion 72 to the inner portion 74.

While a preferred embodiment of the invention has been described hereinabove, it should be clear to one skilled in the art that any number of means may be provided for an extension from the piston 86 to the interior of the housing 18' to make contact with the first piston 38. Similarly, a biasing means in any number of forms might be utilized to produce the compressive braking force during the parking mode without departing from the invention as claimed.

I claim:

1. An improved brake for relatively rotating first and second members of the type which includes a housing having a cylindrical portion and a backing plate, said cylindrical portion being secured to said backing plate and said backing plate being secured to said first member; a plurality of brake discs carried by said housing for relative rotation therewith and axial movement therein, a plurality of reaction plates carried by said second member for relative rotation therewith and axial movement thereon, said discs and said plates being intervened in alternating fashion to define a pack; said housing having a central bore defined by a radially, inwardly extending annular wall of said backing plate and an interior cylindrical surface of said cylindrical portion; a first piston having a tubular portion with a cylindrical outer surface and a radially, outwardly extending wall having an annular surface extending outwardly from said cylindrical outer surface, said first piston being axially, slidably mounted in said bore with said annular wall, said interior cylindrical surface, said exterior cylindrical surface and said annular surface defining a first expandable chamber between said bore and said first piston; a first generally U-shaped expandable seal in said first chamber being seated against said annular wall of said bore and having a pair of lips capable of respectively making sliding, sealing contact with said interior cylindrical surface and said exterior cylindrical surface; a second generally U-shaped expandable seal in said first chamber being seated against said annular surface of said first piston and having a pair of lips capable of respectively making sliding, sealing contact with said interior cylindrical surface and said exterior cylindrical surface; means for selectively introducing hydraulic fluid to and discharging said hydraulic fluid from an intermediate region of said first chamber between said first and said second seals, said hydraulic fluid being sealingly retained therein by said first and said second seals and capable of acting on said first piston for selective movement of said first piston axially relative to said bore; and said tubular portion of said first piston having an end remote from said annular wall of said bore including a radially inwardly extending shoulder which is aligned with said pack to provide compressive braking force thereto when said first piston is moved axially toward said pack by said introduction of said hydraulic fluid to said first chamber, said improvement comprising:

said backing plate having an annular cavity therein open toward an interior of said housing, said cavity being defined by an inwardly facing cylindrical surface and an inwardly extending flange at an end thereof toward said interior of said housing;

a second piston being axially, slidably mounted within said cavity and having an outwardly facing cylindrical surface and an outwardly extending flange thereof at an end thereof remote from said interior of said housing;

said inwardly extending flange, said inwardly facing cylindrical surface, said outwardly facing cylindrical surface, and said outwardly extending flange defining a second expandable chamber between said cavity and said second piston;

axially extending means on said second piston extending into said interior of said housing in alignment with said radially inwardly extending shoulder of said first piston;

means for biasing said second piston toward said pack to cause said axially extending means to contact said radially inwardly extending shoulder which is capable of providing said compressive braking force to said pack;

a third generally U-shaped expandable seal in said second chamber being seated against said inwardly extending flange of said backing plate, a fourth generally U-shaped expandable seal in said second chamber being seated against said outwardly extending flange of said second piston, said third and said fourth seals each having a pair of lips capable of respectively making sliding, sealing contact with said inwardly facing cylindrical surface and said outwardly facing cylindrical surface;

means for the selective introduction of hydraulic fluid to and discharge of hydraulic fluid from said second chamber between said third and said fourth seals, said introduction of said hydraulic fluid being capable of axially moving said second piston away from said pack in opposition to said means for biasing; and said discharge to said hydraulic fluid allowing said means for biasing to produce said compressive braking force to said pack.

* * * * *